Nov. 27, 1923.                                      1,475,871
F. H. PHILLIPS
ANIMAL TRAP
Filed July 15, 1922
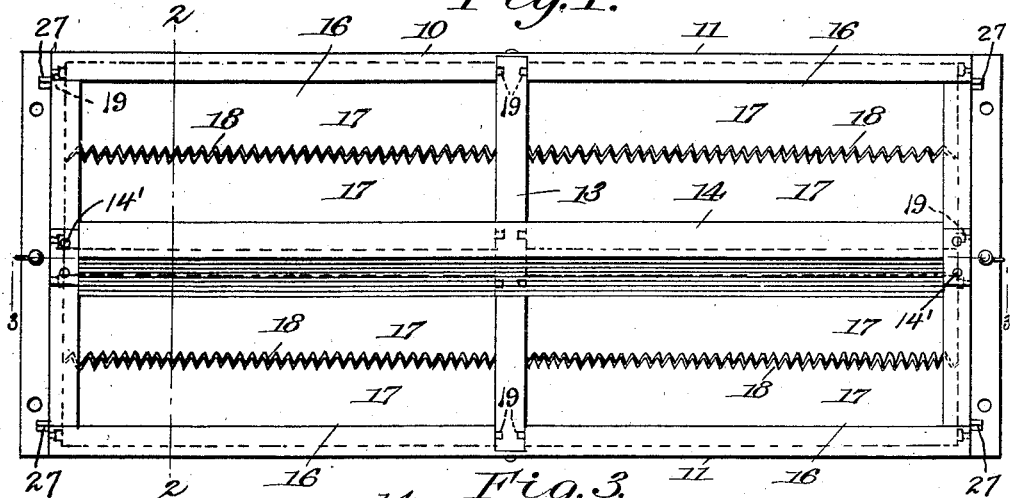
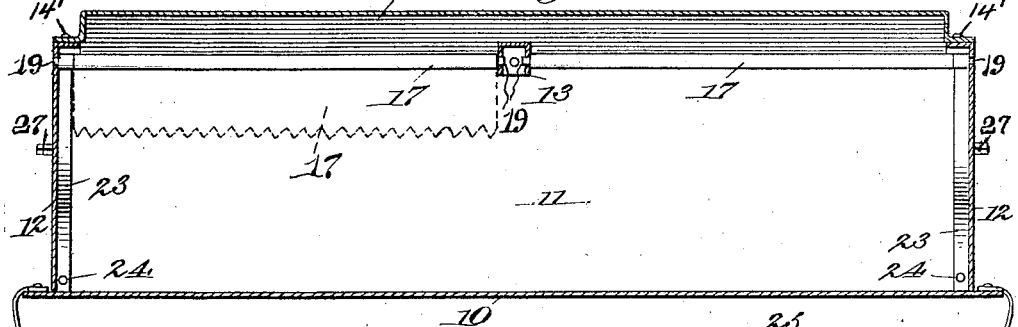
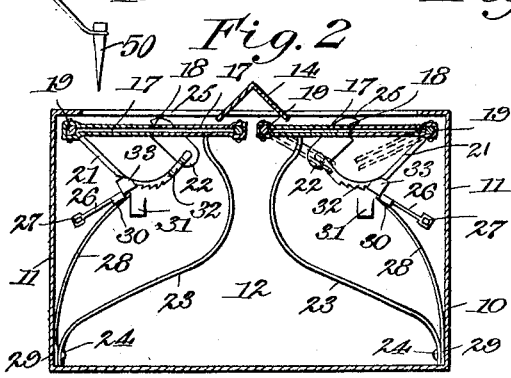
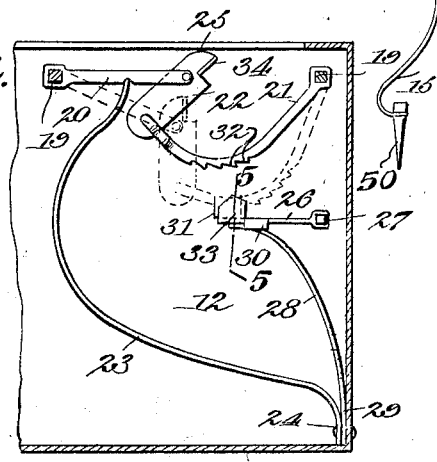
Francis H. Phillips.
INVENTOR
WITNESS: Fred W. Ely.                BY Victor J. Evans
                                        ATTORNEY Patented Nov. 27, 1923.

1,475,871

UNITED STATES PATENT OFFICE.

FRANCIS HENRY PHILLIPS, OF OLD WESTBURY, NEW YORK.

ANIMAL TRAP.

Application filed July 15, 1922. Serial No. 575,426.

*To all whom it may concern:*

Be it known that I, FRANCIS H. PHILLIPS, a citizen of England, residing at Old Westbury, Long Island, in the county of Nassau and State of New York, have invented new and useful Improvements in Animal Traps, of which the following is a specification.

This invention relates to traps.

More particularly the invention relates to animal traps.

Some of the objects of the present invention are: to produce a trap of the character mentioned which is made up from a plurality of closely associated similar units providing means for automatically catching and holding secure with as little pain or injury as possible any kind or size of animal; to produce a trap construction which allows the same to be set in a manner in which no part thereof will be above the surface of the ground thus eliminating obstructions and making for the proper concealment; and with these and other objects in view the invention resides in the particular provision, relative disposition and operation of parts hereinafter fully described and illustrated in the accompanying drawing, in which:—

Figure 1 is plan view.

Figure 2 is a transverse sectional view taken on the line 2—2, of Figure 1.

Figure 3 is a longitudinal sectional view taken on the line 3—3, of Figure 1.

Figure 4 is a detail view partly in section illustrating the relative disposition of the parts connected to one set of trap plates, when the latter are moved to trapping position.

Figure 5 is a detail sectional view taken on the line 5—5, Figure 4.

Referring now more particularly to the several views of the drawing, it will be apparent that the trap of the present invention includes a box-like structure 10 having side walls 11, 11, end walls 12, 12, a transverse centrally arranged cross piece 13, whose opposite ends are attached to the side walls 11, 11, and the longitudinally and centrally arranged piece 14 whose opposite ends are attached as at 14' respectively to the end walls 12, 12. The structure 10 is provided with attaching extensions 15 by virtue of which and suitable fastening elements, 50 the structure may be anchored.

The structure 10 embodies a plurality of similar units 16, there being four in number in the present instance. Inasmuch as the units are similar in construction and operation, a description of one will suffice for all. A description of but one unit therefore will now be given. Trap-plates 17, 17 are hingedly mounted. Each trap-plate 17 is formed from a single piece of material which is bent upon itself to provide spaced members each having serrations 18. Each trap-plate as formed is carried by a bar 19, whose rounded opposite ends are extended in holes in the end wall 12 and cross piece 13 respectively.

In order that the pair of trap-plates 17, 17 may be held in elevated positions, substantially horizontally disposed and with the serrations 18 in interfitting relation; in order that the said plates may move together; and in order that they may be kept under tension with a tendency to move upwardly to a horizontal relation, there is employed a means composed of parts presently described. An arm 20 is connected to one end of one of the bars 19 and a member 21 is connected to one end of the other bar 19. The arm 20 and the member 21 are connected together by a link 22. A spring 23 is employed and has one end thereof attached to a part of the structure 10 as at 24, and the opposite end of the spring is disposed in a notch in the member 20. The spring has a normal tendency to move the arm 20 upwardly and by virtue of the intervention of the link 22, the member 21 will also be moved upwardly. The upward movement of the arm 20 and the member 21 causes the turning of the bars 19, 19 with the result that the trap plates 17, 17 will be moved to horizontal positions. The upward movement of the arm 20 and the member 21 is limited, inasmuch as one end of the link 22 engages a flange portion 25 of the end wall 12.

In order to limit the downward movement of the trap plates 17, 17 and at the same time in order to allow their movement upwardly, there is employed means which consists of a dog 26 provided at one end with guide lugs 30 pivotally mounted as at 27 to the end wall 12 and actuated by a spring 28 having one end attached to a part of the structure 10 as at 29 and the opposite free end in engagement with the dog and positioned between guide lugs 30. A stop lug 31 is attached to or otherwise formed on the end wall 12. The dog 26 is movable so as to be engaged by the stop lug 31 and when so engaged by the said stop lug allows the free movement of the member 21 with respect thereto. At the time the dog 26 is in engagement with the stop lug 31, the trap plates 17, 17 will be horizontally disposed in their normal positions. The weight of an animal brought to bear on the trap plates 17, 17 causes the downward movement thereof, and as a consequence the member 21 will be moved in an arc to a point where the enlargement or irregularity 32 on the member 21 will encounter lug 33 formed on the dog 26 with the result that the dog 26 will be released from engagement with the stop-lug 31. Upon the release of the dog 26, the spring 28 will move the same into co-acting relation with the member 21 to automatically limit downward movement of the trap plates 17, 17 but allowing their upward movement in gripping engagement with the leg or legs of the animal. The link 22 has a lug 34 which is engageable with the arm 20 as shown in Figure 4 to prevent excessive downward movement of the trap plates 17, 17 and also prevent derangement of the proper connection with the arm 20 and the member 21.

The means employed in connection with each set of trap plates is arranged interiorly of the structure 10. It has been found desirable to employ a key for setting the dog of each unit—by setting is meant the engagement of the dog with the stop-lug 31. The key is simply applied to the protruding squared end 27 of the pivot on which the dog is mounted.

It is to be understood that it is within the present invention to produce a trap of but a single unit such as has been hereinabove described. By constructing a trap constituted of a plurality of closely associated units any animal caught for instance with one foot or leg in its struggle may be caught on any other leg or legs therefore preventing the animal from freeing itself.

What is claimed:

1. A trap comprising a walled structure capable of being anchored and embodying a plurality of similar units, each of said units comprising normally horizontally disposed hingedly mounted trap-plates having serrated edges which in the normal elevated relation of the trap-plates confront each other in interfitting relation, means connected to and adapted to cause the trap-plates to move together, said means including a member having ratchet teeth; and a spring actuated dog which coacts with said ratchet-teeth to limit the downward movement of said member preventing the further downward movement of said trap-plates, said dog riding over said ratchet-teeth to allow the upward movement of said member allowing the upward movement of said trap-plates.

2. A trap comprising a walled structure which embodies a plurality of similar units, each of said units comprising normally horizontally disposed hingedly mounted trap-plates having serrated edges which in the normal relation of the trap-plates confront each other in interfitting relation, means connected to the trap-plates causing them to move together, said means including a member having ratchet-teeth; a pivotally mounted spring actuated dog capable of engagement with said ratchet-teeth or of riding over the same, means for holding the said dog against movement under the tension of its spring, and means on said member engageable with said dog upon the downward movement of said member to release said dog to the influence of its spring for the coaction of the dog with said ratchet-teeth.

3. In a trap, movable trap-plates, spring actuated means which connect said trap-plates to move said trap-plates together, said means comprising an arm connected to one trap-plate, a member connected to the other trap-plate, a link pivotally connected to said arm and said member; and means for limiting the movement of said trap-plates.

4. In a trap, movable trap-plates, spring actuated means for causing said trap-plates to move together and for limiting the movement of said trap-plates in opposite directions, said means comprising an arm connected to one trap-plate, a member connected to the other trap-plate, a link pivotally connected to said arm and said member, and a portion on said link movable into and out of engagement with a portion of said arm.

5. In a trap, movable trap-plates, spring actuated means for causing said trap-plates to move together and for limiting the movement of said trap-plates in opposite directions, said means comprising an arm connected to one trap-plate, a member connected to the other trap-plate, a link pivotally connected to said arm and said member, and a portion on said link movable into and out of engagement with a portion of said arm; and spring actuated means having a portion movable into coacting relation with portions on said member to prevent the movement of said member in one direction and to allow the movement of said member in an opposite direction.

6. A trap comprising a plurality of closely associated similar units, each of said units comprising trap-plates supported for movement in which the opposing edges of the trap-plates come close together in their normal relationship and which edges become separated as they are moved from their normal relationship increasing the separation as they move from their normal relationship, means connected to and causing the trap-plates to move together, and means which coact with the first means for limiting the movement of the trap-plates in one direction and for variably limiting the movement thereof in an opposite direction and allowing the movement of said trap-plates in opposite directions.

7. A trap comprising normally elevated downwardly movable trap-plates having serrated edges which in the normal relationship of the trap-plates confront each other in interfitting relationship, means connected to and adapted to cause the trap-plates to move together, and means which coact with the first means for variably limiting the movement of the trap-plates in one direction and allowing their movement in an opposite direction.

8. In a trap, trap-plates yieldingly supported and normally horizontally disposed with portions of one trap-plate opposite similar portions on the other trap-plate in close proximity thereto, and means for variably limiting the movement of the trap-plates when moving to the normal horizontal disposition.

In testimony whereof I have affixed my signature.

FRANCIS HENRY PHILLIPS.